(12) United States Patent
Abdul Kareem et al.

(10) Patent No.: US 10,590,015 B2
(45) Date of Patent: Mar. 17, 2020

(54) DEVICE AND A PROCESS FOR RECOVERING CLEAN WATER AND SURFACTANT CONCENTRATE FROM GREY WATER

(71) Applicant: Conopco, Inc., Englewood Cliffs, NJ (US)

(72) Inventors: Shajahan Abdul Kareem, Pondicherrry (IN); Jaideep Chatterjee, Bangalore (IN); Santosh Kumar Gupta, Bangalore (IN)

(73) Assignee: CONOPCO INC., Englewood Cliffs, NJ (US)

( * ) Notice: Subject to any disclaimer, the term of this patent is extended or adjusted under 35 U.S.C. 154(b) by 46 days.

(21) Appl. No.: 15/555,696

(22) PCT Filed: Feb. 25, 2016

(86) PCT No.: PCT/EP2016/053951
§ 371 (c)(1),
(2) Date: Sep. 5, 2017

(87) PCT Pub. No.: WO2016/150642
PCT Pub. Date: Sep. 29, 2016

(65) Prior Publication Data
US 2018/0044206 A1    Feb. 15, 2018

(30) Foreign Application Priority Data

Mar. 23, 2015 (EP) ..................................... 15160263

(51) Int. Cl.
*C02F 1/44* (2006.01)
*C02F 1/24* (2006.01)
*C02F 103/00* (2006.01)

(52) U.S. Cl.
CPC ................ *C02F 1/444* (2013.01); *C02F 1/24* (2013.01); *C02F 2103/002* (2013.01); *C02F 2303/12* (2013.01)

(58) Field of Classification Search
CPC ...... C02F 1/24; C02F 1/444; C02F 2103/002; C02F 2303/12
See application file for complete search history.

(56) References Cited

U.S. PATENT DOCUMENTS

| 4,505,813 | A | 3/1985 | Graves |
| 6,080,317 | A | 6/2000 | Wagner et al. |
| 2013/0031994 | A1 | 2/2013 | Dort et al. |

FOREIGN PATENT DOCUMENTS

| EP | 0250394 | 12/1987 |
| EP | 1953119 | 8/2008 |

(Continued)

OTHER PUBLICATIONS

Andou S et al., Performance Characteristics of Mechanical Foam-Breakers with Rotating Parts Fitted to Bubble Column, Journal of Chemical Technology & Biotechnology, Jan. 1, 1997, pp. 94-100, XP000686506, vol. 68, No. 1, John Wiley & Sons Ltd., JP (NPL, pp. 1-7).

(Continued)

*Primary Examiner* — John Kim
(74) *Attorney, Agent, or Firm* — Foley & Lardner LLP

(57) ABSTRACT

The present invention relates to a device and a process for purification of grey water and recovery of surfactants and purified water. In particular the invention relates to in-home purification of grey water generated from laundry wash and/or rinse liquor and recovery of surfactants and purified water for water saving by re-use.

13 Claims, 1 Drawing Sheet

(56) References Cited

FOREIGN PATENT DOCUMENTS

| | | |
|---|---|---|
| FR | 1052912 | 3/1963 |
| GB | 2269166 | 2/1994 |
| MX | 2014015918 | 3/2015 |
| WO | WO0200557 | 1/2002 |
| WO | WO2006076446 | 7/2006 |
| WO | WO2011149360 | 12/2011 |
| WO | WO2011160185 | 12/2011 |
| WO | WO2012084621 | 6/2012 |
| WO | WO2015002999 | 1/2015 |
| WO | WO2015003009 | 1/2015 |
| WO | WO2015052036 | 4/2015 |

OTHER PUBLICATIONS

Morris Goldberg et al., Mechanical Foam Breaking, I&EC Process Design & Development, Apr. 30, 1967, pp. 195-200, XP055102322, vol. 6, No. 2, IL (NPL, pp. 8-13).
Search Report & Written Opinion in PCTEP2016053951, dated Apr. 29, 2016, WO (NPL, pp. 14-23).
Search Report and Written Opinion in EP15160263, dated Aug. 25, 2015 (NPL, pp. 24-28).

DEVICE AND A PROCESS FOR RECOVERING CLEAN WATER AND SURFACTANT CONCENTRATE FROM GREY WATER

FIELD OF THE INVENTION

The present invention relates to a device and a process for purification of grey water and recovery of surfactants and purified water. In particular the invention relates to in-home purification of grey water generated from laundry wash and/or rinse liquor and recovery of surfactants and purified water for water saving by re-use.

BACKGROUND OF THE INVENTION

Any discussion of the prior art throughout the specification should in no way be considered as an admission that such prior art is widely known or forms part of the common general knowledge in the field.

In several geographies water shortage is becoming a more and more acute problem and this is particularly true in developing countries.

Household cleaning processes like washing laundry, dishes etc, require large amounts of water. It will be a great benefit to the society if it will be possible to save this water and also reuse the water used in such activities. The water generated in-home from washing and rinsing laundry is generally referred to as grey water. In order to reuse such household grey water for various activities it is essential to remove all the particulate matter and the surfactants.

Several water purification processes using chemicals such as flocculants and coagulants especially for making water safe for drinking are known in the art. There are also several techniques to purify industrial waste water. Most of these methods involve use of chemicals like aluminium salts and polymers which have an adverse effect on the environment.

WO2002000557 (P&G) describes a water purification composition comprising essentially a primary coagulant, a bridging flocculent, a coagulant aid and optionally a disinfectant. This patent application also claims a method for clarifying and purifying water, which comprises several stages selected from coagulation and flocculation, disinfection, filtration, neutralisation and fortification.

EP1953119 (Unilever) describes solid water purification composition in the form of a two-component system, with a first component comprising a biocide and a water-insoluble adsorbent, and a second component comprising a coagulating agent and a flocculating agent. A biocide quencher may be included in the composition.

WO2012084621 (Unilever), discloses a fast water purification and clarification process for the treatment of household water, especially laundry wash and more typically laundry rinse water by using a composition comprising flocculant, coagulant, filler and cationic surfactant, effective for water clarification and purification.

WO15003009 (Aquacache Inc) discloses a method for treating wastewater containing solid materials and one or more of fats, oils and grease which comprises simultaneously subjecting water to be treated to sparging air in the presence of singlet oxygen and/or hydrogen peroxide. The method for purifying grey water is by using advanced oxidation to degrade the organics and surfactants. The singlet oxygen is generated by a reaction of hydrogen peroxide and sodium hypochlorite. The aeration produces foam, which is used to remove the solids, fats and oily soils by a method similar to froth flotation. The foam is handled/broken by using vacuum. The method is very elaborate and involves the use of many difficult to handle chemicals and does not teach how to recover the surfactants from grey water but would actually be degrading the organics and surfactants.

US201331994 (Nexus Ewater) discloses to a process and apparatus that treats waste water, in particular waste water containing surfactants and including grey water, for local reuse. In this process a gas is used to treat the waste water which leads to the generation of bubbles. The bubbles are moved to a "separating chamber", from which some liquid may further drain out. This liquid is recycled to the main waste water containing chamber. Water treatment occurs by coarse filtration (>200 microns), adsorptive filtration and UV treatment. The gas used for generating the bubbles is air or ozone, which is claimed to be generated by exposing the waste water to UV light. The Gas injection rate is 1 to 4 LPM. Activated carbon filters are used for adsorptive removal of residual surfactants from the waste water.

The foam is generated at a very low rate (1 to 4 LPM), and the bubbles are separated out in a separate chamber for drying. This would require a lot of space, especially for treating high surfactant concentrations in grey water in an in-home device such as a washing machine. It does not disclose how surfactant can be recovered from the foam in a continuous high speed operation. The use of ozone shows that chemical degradation of the surfactant is desired, by oxidation, and no surfactant recovery is mentioned.

A device and a process for purification of grey water, especially grey water generated in household processes such as laundry wash and rinse water without the addition of chemicals is highly desired and is beneficial to the environment.

Goldberg and Rubin (I & EC Process Design and Development, 1967, Vol 6) disclose process of mechanical foam breaking by the shearing action of a high speed rotating disc. However it only discloses foam flow rates upto 200 ml/min by using a smooth disc rotating at a speed of about 2500 rpm. The surfactant used in the process was Triton X-100 which is not a very high foaming surfactant and at relatively low concentrations. They also had a limitation on the disc speed and aeration rate because of which there was increased amount of liquid carried with the foam. They do not disclose how to recover purified water or surfactant concentrate from grey water.

Andou S et al., (Performance characteristics of mechanical foam breakers with rotating parts fitted to bubble column, J. of chem. tech. and biotech, vol 68, no. 1, 1 Jan., 1997, pg 94-100), compares mechanical foam breakers shaped like fans with vanes/blades oriented perpendicular to the plane rotation with the "blades" in various orientations. These foam breakers, not only consume more power, but also cause a fine mist of droplets in the exhaust air and the liquid phase of the foam gets scattered into a mist which is carried with the air-flow stream leaving the foam breaker. Thus the recovery and collection of pure water from grey water is low.

Our co-pending application EP13187691 discloses a device and a physical process for purification of grey water especially for in-home purification, which process does not require the addition of chemicals. It was found that it was possible to design a device and a process where, by continuous aeration, more than 90% of the surfactant present in used laundry water can be transferred into foam. If the foam was then allowed to channel out from the chamber holding the grey water, and made to collapse outside the chamber, a device and process could be built to remove dissolved surfactants from water. It was thus possible to recover more than 90% of grey water as purified water even when the surfactant level in the grey water was as high as 0.1%. The recovered purified water preferably could be subsequently passed through at least one filter to get further purified water. The key step in achieving the above was the ability to cause foam collapse at very high volumetric flow rate of the foam.

The process and device disclosed in EP13187691 is capable of recovering pure water from laundry waste water by concentrating the dirt and the surfactants present in laundry waste water, as a "reject" which is around 10% of the volume of the initial laundry waste water. Since the dirt and oily soils from the laundry process are mixed with these surfactants from the laundry products in this concentrated waste stream, this reject liquid has to be discarded. This concentrated reject is both a burden on the environment as well as a loss of surfactants which could be reused. It would be highly beneficial, if a clean surfactant solution could be extracted from this "dirt" containing surfactant concentrate reject.

In addition to the above, the presence of oily soil and dirt particles present in laundry waste waters interfere with the foam generation in the aeration step. This leads to sub-optimal removal of the surface active agents from the laundry waste water by aeration and foam collapse. Hence it would be beneficial to design a device and a method which ensures efficient removal of surfactant from the laundry waste water, irrespective of the quantity and type of soils present in the laundry waste water.

It has now been found that if the laundry wash liquor is passed through an ultra filter capable of removing dirt and oily soils present in laundry waste water prior to the aeration and foam breaking it is possible to get a surfactant rich concentrate from the collapsed foam, purified water and a reject containing the particulate and oily soil. It is thus possible to recover up to 70% of the initial surfactant in the wash liquor as a liquid concentrate and up to 90% of the laundry waste water as the purified water.

It is an object of the present invention to provide a device for recovery of surfactant concentrate and purified water by purification of grey water generated in household process, especially laundry wash and rinse processes without the addition of chemicals that have an adverse effect on the environment.

It is another object of the present invention to provide a device for recovery of surfactant concentrate and purified water where the surfactant level of the grey water is reduced to less than 1 ppm.

It is another object of the invention to provide a simple physical process for purification of grey water where 70% of the surfactant is recovered as surfactant concentrate and more than 90% recovery of purified water can be achieved.

SUMMARY OF THE INVENTION

According to one aspect of the present invention there is provided a device for purification of grey water and recovery of surfactants and purified water comprising:
  i. an air tight container (3) for holding grey water comprising an outlet port (4) for discharging out foam;
  ii. the container (3) comprising a means for aeration (5a) of contents of the container (3);
  iii. a foam conveyor (6) connected to the outlet port (4);
  iv. a foam breaking device (7);
  v. an ultra filter (1),
  vi. a pump (2), wherein the ultra filter (1) and the pump (2) are in fluid communication with the air tight container (3);
wherein the outlet port (4) is in fluid communication with the foam breaking device (7); and
wherein the foam breaking device (7) comprises:
  a. an inverted cup (8) with open mouth of the cup positioned in a collection tray (9);
  b. a disc (10) connected to a motor (11) to facilitate rotation of the disc (10) and placed in the cup (8) and rotatably connected to base of the cup (8);
wherein the foam conveyor (6) establishes fluid communication between the outlet port (4) and the disc (10) of the foam breaking device (7) and wherein the surface of the disc is rough.

According to another aspect of the present invention there is provided a device for purification of grey water and recovery of surfactants and purified water comprising:
  i. an air tight container (3) for holding grey water comprising an outlet port (4) for discharging out foam;
  ii. the container (3) comprising a means for aeration (5a) of contents of the container (3);
  iii. a foam conveyor (6) connected to the outlet port (4);
  iv. a foam breaking device (7);
  v. an ultra filter (1),
  vi. a pump (2),
wherein the ultra filter (1) and the pump (2) are in fluid communication with the air tight container (3);
wherein the outlet port (4) is in fluid communication with the foam breaking device (7); and
wherein the foam breaking device (7) comprises:
  a. an inverted cup (8) positioned over a collection tray (9) wherein the cup is fixed to the collection tray and is provided with an air vent (12);
  b. a disc (10) connected to a motor (11) to facilitate rotation of the disc (10) and placed above the collection tray and rotatably connected to the lid of the collection tray;
wherein the foam conveyor (6) establishes fluid communication between the outlet port (4) and the disc (10) of the foam breaking device (7) and wherein the surface of the disc is rough.

It is preferred that the rotation speed of the disc is in the range of 1000 rpm to 10000 rpm.

According to yet another aspect of the present invention there is provided a process for purification of grey water and recovery of surfactants and purified water using a device according to the invention comprising:
  a. filtering the grey water through an ultra filter;
  b. sparging air at a flow rate of 1-200 L/min into the filtered grey water to be purified contained in the airtight container;
  c. providing the foam generated a residence time of at least half a minute;
  d. channeling foam generated from the container onto rotating disc of the foam breaking device; and
  e. stopping the sparging of air after a time period of at least 1 minute.

It is preferred that the surfactant concentrate is recovered from the collection tray and the purified water from the airtight container.

It is preferred that reject water comprising soil from the ultra filter is drained out periodically.

It is preferred that ratio of grey water to air in the container is in the range of 1:1 to 1:100.

In the above process it is preferable to pass the purified water through at least one filter.

DETAILED DESCRIPTION OF THE INVENTION

The features and advantages of the invention will become apparent to those of ordinary skill in the art from a reading of the following detailed description and the appended claims. For the avoidance of doubt, any feature of one aspect of the present invention may be utilized in any other aspect of the invention. The word "comprising" is intended to mean "including" but not necessarily "consisting of" or "composed of." In other words, the listed steps or options need not be exhaustive. It is noted that the examples, embodiment and figures given in the description below are intended to clarify the invention and are not intended to limit the invention to those examples per se.

The present invention relates to a device and a process for in-home purification of grey water and recovery of surfactants and purified water which enables aeration of grey water for generating foam and physical breaking of the foam thus eliminating the surfactants present therein from the water and enabling concentrating the same to recover the surfactant. In particular the invention relates to in-home purification of grey water generated from laundry wash and/or rinse liquor for water saving by re-use and recovering the clean surfactants which get wasted otherwise for re-use. The present invention thus provides a device and process of in-home purification of grey water and recovery of surfactants and purified water without the use of any chemicals.

According to one aspect of the present invention there is provided a device for purification of grey water and recovery of surfactants and purified water comprising:
  i. an air tight container (3) for holding grey water comprising an outlet port (4) for discharging out foam;
  ii. the container (3) comprising a means for aeration (5a) of contents of the container (3);
  iii. a foam conveyor (6) connected to the outlet port (4);
  iv. a foam breaking device (7);
  v. an ultra filter (1),
  vi. a pump (2),
wherein the ultra filter (1) and the pump (2) are in fluid communication with the air tight container (3);
wherein the outlet port (4) is in fluid communication with the foam breaking device (7); and
wherein the foam breaking device (7) comprises:
  a. an inverted cup (8) with open mouth of the cup positioned in a collection tray (9);
  b. a disc (10) connected to a motor (11) to facilitate rotation of the disc (10) and placed in the cup (8) and rotatably connected to base of the cup (8);
wherein the foam conveyor (6) establishes fluid communication between the outlet port (4) and the disc (10) of the foam breaking device (7) and wherein the surface of the disc is rough.

According to another aspect of the present invention there is provided a device for purification of grey water and recovery of surfactants and purified water comprising:
  i. an air tight container (3) for holding grey water comprising an outlet port (4) for discharging out foam;
  ii. the container (3) comprising a means for aeration (5a) of contents of the container (3);
  iii. a foam conveyor (6) connected to the outlet port (4);
  iv. a foam breaking device (7);
  v. an ultra filter (1),
  vi. a pump (2),
wherein the ultra filter (1) and the pump (2) are in fluid communication with the air tight container (3);
wherein the outlet port (4) is in fluid communication with the foam breaking device (7); and
wherein the foam breaking device (7) comprises:
  a. an inverted cup (8) positioned over a collection tray (9) wherein the cup is fixed to the collection tray and is provided with an air vent (12);
  b. a disc (10) connected to a motor (11) to facilitate rotation of the disc (10) and placed above the collection tray and rotatably connected to the lid of the collection tray;
wherein the foam conveyor (6) establishes fluid communication between the outlet port (4) and the disc (10) of the foam breaking device (7) and wherein the surface of the disc is rough.

It is preferred that the rotation speed of the disc is in the range of 1000 rpm to 10000 rpm.

The invention will now be exemplified with the following non-limiting figures.

DETAILED DESCRIPTION OF THE DRAWINGS

Figure 1:
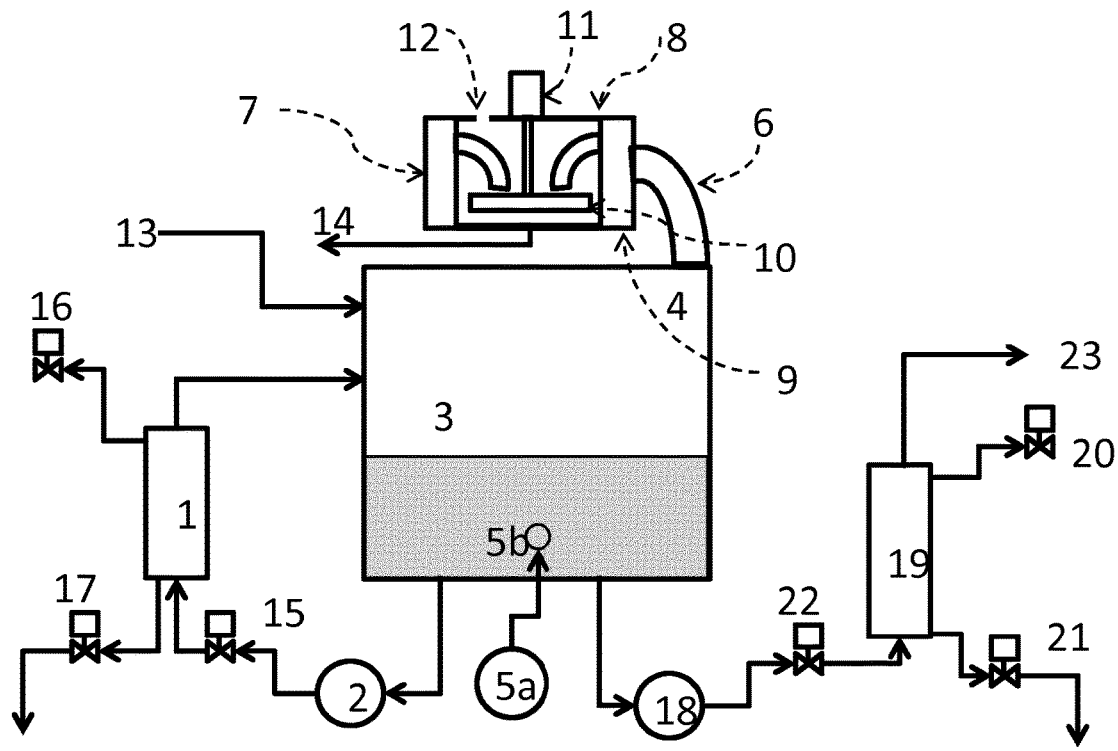
FIG. 1 is a perspective view of an embodiment of the device for in-home purification recovery of surfactants and purified water in accordance with the invention.

FIG. 1 is a perspective view of an embodiment of the device for in-home purification recovery of surfactants and purified water comprising an ultra filter (1) and an air tight container (3) from which the grey water is passed through the ultra filter using a water pump (2). The filtered water is allowed to enter back into the air tight container in a manner so as to minimize turbulent mixing of the filtered water and the grey water in the air tight container (3). A shut-off valve (15) is positioned between the water pump and the ultra filter and is opened when the grey water pump (2) is started, and closed when the said pump is closed. This shut-off valve prevents the back-flow of the concentrated reject from the ultra filter. After the grey water has been filtered through the ultra filter, for a duration which is at least equal to the volume of the grey water divided by the flow rate of the pump, the filtration is stopped. The grey water is aerated by using the aerator (5a), which bubbles air through the sparger (5b). The foam generated is channeled out of the air tight container (3), through outlet port (4), and is conveyed through the foam conveyor (6) to the foam breaking device (7). The foam breaking unit consists of an inverted cup (8) positioned on top of a collection tray (9). A disc (10) is axially connected to a motor (11), which is mounted on top of the inverted cup. The top of the foam breaker (7) is provided by at least one air vent (12). The foam breaker is also provided with additional foam conveyors (6), which cause the foam to be channeled to the surface of the rotating disc (10). In operation the foam is channeled onto the rotating disc, where it is broken by shearing action. The released air leaves the foam breaker from the top air vents (12), while the concentrated surfactant containing liquid, resulting from the collapsed foam is collected from the outlet port (14).

Grey water can be introduced into the air tight container (3), through the inlet port (13). It is preferred that the ultra filter (1) is placed in a closed casing which in addition to its inlet and outlet, is provided with a valve for venting the ultra filter casing (16), and a valve for draining the ultra filter casing (17). The water drained from the ultra filter casing, contains concentrated soil, which is removed from the grey water by filtration, and is to be discarded as reject. After aeration has been conducted for sufficient time, such that the residual water in the air tight container (3) is substantially free of surfactants to produce foam, aeration is stopped. The rate of aeration is such that the residence time of foam before it is conveyed out of the container is at least 1 minute, preferably longer, and up to 10 minutes. The above system design ensures that the volume of residual water remaining in air the tight container (3) is in excess of 80% of the initial grey water in air tight container (3). This residual water can be pumped out using effluent pump (18), through a polishing filter (19), to get pure water, at the pure water outlet port (23). It is preferred that the polishing filter is provided with an air vent (20) and a drain valve (21). These are to be left open when the filter is not in use and closed when the filter is in use, to prevent the stagnation of water in the polishing filter and the generation of odours in the polishing filter.

Figure 2:
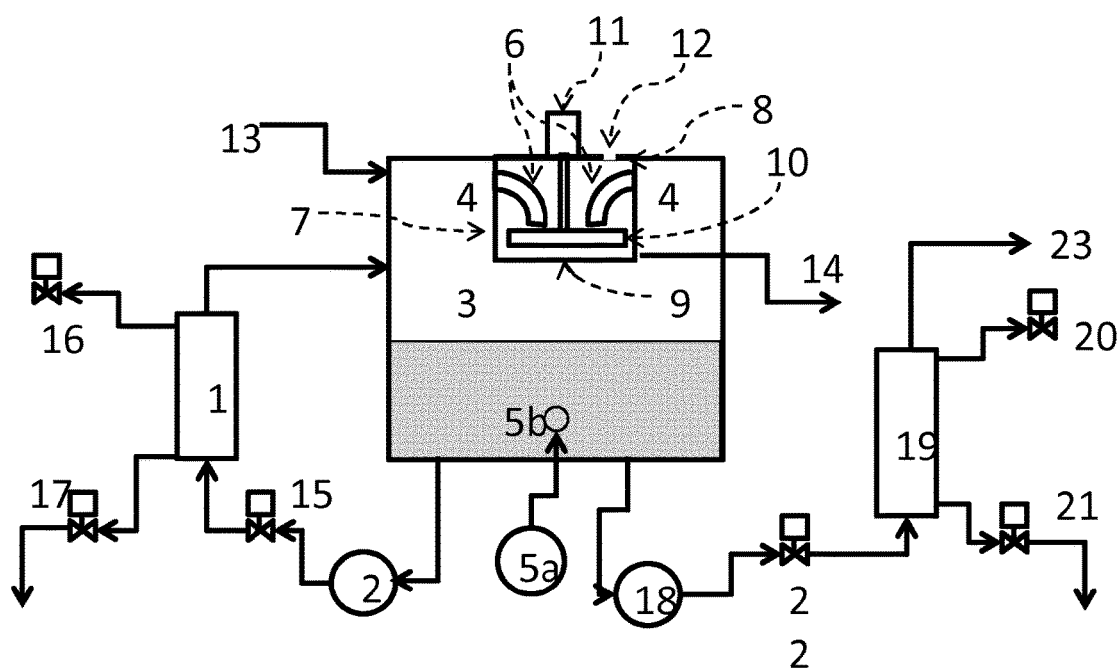
FIG. 2 is a perspective view of another embodiment of the device for in-home purification recovery of surfactants and purified water in accordance with the invention.

FIG. 2 is a perspective view of another embodiment of the device for in-home purification recovery of surfactants and purified water wherein the foam breaking device (7) is positioned within the air tight container (3), but functionally separated from it. The foam is conveyed through the outlet port (4), through the foam conveyors (6), and onto the rotating disc (10), where the high shear of the rotating disc, causes collapse of the foam, with the air from the foam leaving the system from the air vent (12), and the surfactant concentrate is collected from outlet port (14).

The Container for Holding Grey Water:

The container for holding grey water is preferably selected from any commercially available vessel which is air tight such as a closed bucket or a drum made of polymer or metal. For in-home use the capacity of the container is preferably in the range 10 litres to 200 litres and more preferably 20 litres to 50 litres. The outlet port is preferably provided at the top of the container and preferably above the level of the grey water in the container and more preferably on the top surface of the closed container. The foam generated is channeled out of the air tight container through outlet port and is conveyed through the foam conveyor to the foam breaking device.

The foam conveyor is of any geometric cross section and preferably of a circular cross section. The foam conveying tube has preferably a diameter in the range of about 1 cm to the diameter of the vessel and more preferably in the range of 1 cm to 30 cm and still more preferably in the range of 3 to 15 cm. It is preferable to use more than one foam conveying tube for conveying the foam from the container.

The container is also preferably provided with an inlet port for introducing the grey water to be purified. The container is also preferably provided with a discharge port at the bottom for discharging purified water.

The ratio of grey water to air in the container is preferably in the range of 1:1 to 1:100 and more preferably in the range of 1:1 to 1:20. It is particularly preferred that ratio of the grey water to air in the container is 1:3.

Ultra Filter:

An ultra filter is provided which is in fluid communication with the air tight container and pump is provided upstream the filter. The pump is preferably a centrifugal pump and preferably aids in pumping grey water from the air tight container through the ultra filter back into the air tight container. A shut-off valve preferably provided between the ultra filter and the pump. This valve preferably prevents the back-flow of the concentrated reject from the ultra-filter.

The ultra filter is preferably a filter where particles larger than 100 nm will not pass through. The ultra filter is preferably a high surface area filter and preferably selected from a hollow fibre membrane, a ceramic membrane, a microfiltration membrane or a depth filter comprising of polymer fibers, or activated carbon. The ultra filter is more preferably a hollow fibre membrane, a ceramic membrane.

It is preferred that the ultra filter is encased in a casing. The casing preferably in addition to its inlet and outlet, is provided with a valve for venting the filter casing and preferably a valve for draining the casing.

Means for Aeration:

The container is provided with a means for aerating the contents of the container. The aerating means is preferably selected from those used in the art such as a miniaturized compressor or air pump which is capable of providing air preferably at a flow rate of 1litre to 200 litres per minute, which allows the air to form bubbles leading to the generation of stable foam. The air pump is preferably positioned outside the container but bubbles air into the grey water in the container, which may preferably be achieved by connecting a tube from the pump into the grey water. The end of the tube preferably has a sparger with preferably multiple pores. The pore size is preferably in the range of 1-1000 microns and more preferably 10-200 microns.

Foam Breaking Device:

The foam breaking device is preferably positioned external to the container and is preferably positioned at the top part of the container to make the device more compact. In another embodiment the foam breaking device is preferably positioned within the air tight container but functionally separated from it and preferably above the level of the grey water. The foam breaking device is preferably is fixed to the ceiling of the air tight container. The foam breaking device comprises an inverted cup with the open mouth of the cup positioned in a collection tray and a disc connected to a motor to facilitate rotation of the disc at preferably a speed varying in the range of 1000 rpm to 10000 rpm and more preferably in the range of 3000 rpm to 8000 rpm and more preferably 4000 rpm to 6000 rpm. The motor is preferably placed on the cup and rotatably connected to the base of the cup. The motor is of any type which is capable of producing the required rotation of the disc.

It is preferred that the inverted cup and the collection tray form a single unit with air vents provided in the unit to preferably ensure that a positive pressure in the range 1 to 1000 cm of water column is created in the foam breaking device. This positive pressure preferably enables that the foam breaking device is operated at foam flow rates in the range 1 to 200 L/min and preferably at a flow rate 2 to 50 L/min.

The foam conveyor connected to the outlet port of the container establishes fluid communication between the outlet port and the disc of the foam breaking device and distance between the discharging end of the foam conveyor and the rotating surface of the disc is preferably less than 5 mm and more preferably less than 2 mm. It is preferable to have more than one foam conveyor for discharging the foam from the container onto the disc. The discharging end of the foam conveyor preferably has at least two outlet ports so that the foam is preferably distributed on the disc as it gets discharged on the disc. The discharging end of the foam conveyor ends just above the rotating disc and the foam is preferably conveyed from the discharging end of the foam conveyor on to the disc.

It is preferred that the bulk of the grey water to be purified is below the foam in the container to preferably ensure that the water drains out from the foam under gravity to achieve relatively high pure water recovery. This is achieved by preferably minimizing the volume of the foam conveyors.

The disc is formed of a material selected from metals, polymers, ceramic etc. and preferably polymeric materials. The diameter of the disc varies preferably in the range from 5 cm to 50 cm and more preferably in the range of 10 cm to 20 cm. The surface of the disc that contacts the foam has preferably a roughened surface morphology. The surface preferably comprises elements with a dimension that is smaller than the median bubble size of the foam. The elements preferably have a dimension of between 0.01 and 3 millimetres, more preferably dimension of between 0.1 and 2 millimetres. The elements can for example be protrusions from the disk or material that is connected to the disc, e.g. sand or granular materials. The surface of the disc preferably comprises a pattern, and preferably the pattern is formed by or comprises concentric corrugations. The pattern can be formed by a concentric arrangement of roughness on the surface of the disc.

The rate of flow of the foam on to the disc is preferably 1 to 200 L/min and more preferably 2 to 50 L/min.

An effluent pump is preferably provided to pump the residual water from the air tight container which preferably pumps the water through a polishing filter to further eliminate dissolved and suspended impurities.

The filter is made of materials preferably selected from activated alumina, silica, diatomaceous earth, granular activated carbon, layered double hydroxides, powdered activated carbon, synthetic fibre/fabric media, filtration media based on polymeric fibres etc. and more preferably selected from materials such as synthetic fibres, activated carbon and layered double hydroxides.

According to yet another aspect of the present invention there is provided a process for purification of grey water and recovery of surfactants and purified water using a device according to the invention comprising:
 a. filtering the grey water through an ultra filter;
 b. sparging air at a flow rate of 1-200 L/min into the filtered grey water to be purified contained in the airtight container;
 c. providing the foam generated a residence time of at least half a minute;
 d. channelling foam generated from the container onto rotating disc of the foam breaking device; and
 e. stopping the sparging of air after a time period of at least 1 minute.

The surfactant concentrate is preferably recovered, by maintaining a small positive air-pressure within the foam breaker, from the collection tray and the purified water from the air tight container. A small positive pressure is preferably maintained within the foam breaking unit, by varying the size of the air-vent ports. Preferably the small hydrostatic pressure caused by the level of the surfactant concentrate outlet port being below the level of the collection tray, is augmented by the small positive pressure within the foam breaker, leading to draining out of the surfactant concentrate from the surfactant concentrate outlet port.

An ultra filter is provided which is in fluid communication with the air tight container and pump is provided upstream the filter. A shut-off valve is preferably provided between the ultra filter and the pump. This valve preferably prevents the back-flow of the concentrated reject from the ultra filter. The pump is preferably a centrifugal pump and preferably aids in pumping grey water from the air tight container through the ultra filter back into the air tight container.

The shut-off valve preferably positioned between the ultra filter and the water pump is preferably opened when the water pump is started, and closed when the said pump is closed. The grey water is preferably filtered through the ultra filter for a duration which is at least equal to the volume of the grey water divided by the flow rate of the pump before the filtration is stopped.

It is preferred that reject water comprising soil from the ultra filter is drained out periodically. The draining of the reject water from the ultra filter is done preferably after every batch of purification by opening the valves for venting the ultra filter casing and the valve for draining the ultra filter casing ensuring that the pump is switched off.

The ratio of grey water to air in the container is preferably in the range of 1:1 to 1:100 and more preferably in the range of 1:1 to 1:20. It is particularly preferred that ratio of the grey water to air in the container is 1:3.

The residual water from the air tight container is preferably pumped out using effluent pump through a polishing filter to further eliminate dissolved and suspended impurities and to get pure water. It is preferred that the polishing filter is provided with an air vent and a drain valve which are preferably left open when the filter is not in use and closed when the filter is in use, to prevent the stagnation of water in the polishing filter and the generation of odours in the polishing filter.

Alternatively this process to eliminate dissolved and suspended impurities can be achieved by a gravity driven process.

The recovered purified water is preferably passed through a filter comprising materials preferably selected from activated alumina, silica, diatomaceous earth, granular activated carbon, layered double hydroxides, powdered activated carbon, synthetic fibre/fabric media, filtration media based on polymeric fibres etc. and more preferably selected from materials such as synthetic fibres, activated carbon and layered double hydroxides.

In one aspect of the present invention the sparging of air is done at a flow rate in the range of 1-200 L/min and preferably at a flow rate in the range of 2-50 L/min.

In one aspect of the present invention the foam generated is channeled at a flow rate of 1 to 200 L/min and preferably at a flow rate 2 to 50 L/min.

Residence Time:

Residence time is the time an average element of the foam spends in the container before exiting into the foam conveyor. It is the time elapsed from the generation of a typical foam cell upto the time when this foam cell exits the closed container. Residence time is calculated by the following formula.

$$\text{Residence time} = \text{Container head space volume} / \text{Air flow rate}$$

The residence time provided is preferably in the range 30 seconds to 60 minutes and more preferably 1 minute to 30 minutes. Preferably allowing the foam to drain in the container or providing residence time enables to preferably obtain substantially dry foam.

In one aspect it was a surprising finding of the present invention that through the device and process of the invention, the surfactant concentration of the grey water was unexpectedly reduced from around 100 ppm-1000 ppm to below detection levels or less than 1 ppm.

EXAMPLES

Purification of Grey Water and Recovery of Surfactants:

A device as shown in FIG. 2 was used for the experiments except that in the control experiments, the pump (2) and the ultra filter (1) were not present.

Grey water was obtained from the outlet of a top loading Samsung washing machine after it had completed a wash cycle, with a wash load of 6 Kg of heavily soiled consumer garments. The internal capacity of the air tight container of the device used in the experiments was ~50 Litre. 10 Litres of grey water from the above was introduced into the air tight container. The grey water was aerated by pumping air at a rate of 15 L/minute. Aeration produced foam, which got mixed with the soil present in the grey water. The foam that was generated raised in the air tight container and got channeled through the foam conveyors of diameter of 2.5 Cm on to the rotating disc of diameter of 12 Cm of the foam breaking device where the disc was moving at a speed 6000 rpm. The foam breaking device collapses the foam to release the air in the foam. The aeration and foam breaking was continued for 25 minutes. The residence time was about 2-3 minutes. For both the experimental and control sets the process was repeated 4 times.

i. Device According to the Invention:

A device as shown in FIG. 2 was used for the experiments where a commercially available ultra filter obtained in the hollow fibre filter configuration, having a total surface area of approximately 1 square meter, was used. The grey water as described above was passed through the ultra filter by using a pump. The pump at was operated for a duration of 20 minutes which ensures that all the grey water passes through the ultra filter and the filtered grey water is pumped back into the air tight container. The filtered water was introduced back into the air tight container, in a manner so as to minimize turbulent mixing of the filtered water with the grey water in the air tight container. The ultra filter casing is drained by opening the vent valve and the drain valve after the pump was switched off.

Aeration was started after switching off the grey water pump as described above. The results are reported in table 2. The concentrated surfactant collected in the collection tray obtained from the collapsed foam was collected through the outlet in the collection tray. The residual grey water in the air tight container was passed through a carbon block filter, which resulted in clean purified water. The percent recovery of surfactant and the percent recovery of clean purified water are shown in table 1.

ii. Control Experiments:

In the control experiments the concentrated surfactant collected in the collection tray obtained from the collapsed foam contained a lot of soil and hence was not suitable for re-use. The residual grey water in the air tight container was found to contain surfactant and was turbid and further aeration could not generate further foam. The data are presented in table 2.

TABLE 1

Recovery of surfactant and purified water using the device according to the invention with an ultra filter prior to breaking of the foam.

| Data with the use of ultra filter | Surfactant Concentration in ppm | | | % Recovery of Surfactant | % Recovery of clean water | Turbidity, NTU | |
|---|---|---|---|---|---|---|---|
| Batch | Initial | Final | Recovered | Surfactant | water | Initial | Final |
| 1 | 222 | 25 | 1086 | 64 | 84 | 228 | 4 |
| 2 | 222 | 33 | 1197 | 70 | 84 | 191 | 5 |
| 3 | 222 | 20 | 1225 | 72 | 85 | 165 | 4 |
| 4 | 222 | 39 | 1559 | 56 | 90 | 140 | 14 |
| Average | 222 | 29.2 | 1266.7 | 65.5 | 86 | 181 | 6.7 |

The data presented in Table 1 show that on an average 65% of the surfactant could be recovered as clean liquid surfactants and 80-90% grey water as clean water. The turbidity of the water was greatly reduced and brought down to acceptable levels.

TABLE 2

Control experiment without the use of the ultra filtration

| Data without the use of ultra filter | Surfactant Concentration in ppm | | | % Recovery of Surfactant | % Recovery of clean water | Turbidity, NTU | |
|---|---|---|---|---|---|---|---|
| Batch | Initial | Final | Recovered | Surfactant | water | Initial | Final |
| 1 | 195 | 133 | 0 | 0 | 0 | 230 | 210 |
| 2 | 306 | 125 | 0 | 0 | 0 | 333 | 306 |
| 3 | 235 | 75 | 0 | 0 | 0 | 249 | 193 |
| 4 | 208 | 67 | 0 | 0 | 0 | 161 | 155 |
| Average | 236 | 100 | 0 | 0 | 0 | 243.2 | 216 |

The residual surfactant level and turbidity in the residual grey water, could not be removed by filtration through a bed of carbon/carbon block filter. Hence no clean surfactant concentrate and no clean water could be obtained from the control experiments. This was repeated with several batches of grey water, but the results did not improve.

The poor performance of the control samples is because of the heavy soil load in the initial grey water that was used in the experiments. The use of the ultra filter thus was capable of handling the high soil load and ensures that clean surfactant and purified water could be recovered from grey water with heavy soil load.

The invention claimed is:

1. A device for purification of grey water and recovery of surfactants and purified water comprising:
   i. an air tight container for holding grey water comprising a first outlet port for discharging out foam and a discharge port for discharging out purified water;
   ii. the container comprising a means for aeration of contents of the container;
   iii. a foam conveyor connected to the first outlet port;
   iv. a foam breaking device;
   v. an ultra filter; and
   vi. a pump configured to receive the grey water from the air tight container, provide the grey water to the ultra filter, and cause filtered grey water to be provided from the ultra filter to the air tight container;
   wherein the ultra filter and the pump are in fluid communication with the air tight container;
   wherein the first outlet port is in fluid communication with the foam breaking device;

wherein the foam breaking device comprises:
   a. an inverted cup with open mouth of the cup positioned in a collection tray;
   b. a disc connected to a motor to facilitate rotation of the disc and placed in the cup and rotatably connected to base of the cup;
   c. a second outlet port for receiving concentrated surfactants; and
   d. an air vent configured to create a positive pressure within the foam breaking device; and
wherein the foam conveyor establishes fluid communication between the first outlet port and the disc of the foam breaking device.

2. A device for purification of grey water and recovery of surfactants and purified water as claimed in claim 1, further comprising a shut-off valve between the ultra filter and the pump.

3. A device for purification of grey water and recovery of surfactants and purified water as claimed in claim h wherein the ultra filter is encased in a casing.

4. A device for purification of grey water and recovery of surfactants and purified water as claimed in claim 1, wherein the ultra filter comprises an ultra filter casing vent valve and ultra filter casing drain valve.

5. A device for purification of grey water and recovery of surfactants and purified water as claimed in claim h wherein the ultra filter is selected from a hollow fibre membrane, a ceramic membrane, a microfiltration membrane or a depth filter comprising of polymer fibers, or activated carbon.

6. A device for purification of grey water and recovery of surfactants and purified water as claimed in claim k wherein the ultra filter is selected from a hollow fibre membrane or a ceramic membrane.

7. A device for purification of grey water and recovery of surfactants and purified water as claimed in claim h wherein distance between the discharging end of the foam conveyor and the rotating surface of the disc is less than 5 mm.

8. A device for purification of grey water and recovery of surfactants and purified water as claimed in claim h wherein the rotation speed of the disc is in the range 1000 rpm to 10000 rpm.

9. A device for purification of grey water and recovery of surfactants and purified water as claimed in claim h wherein the means for aeration is connected to a sparger placed under the grey water in the air tight container.

10. A device for purification of grey water and recovery of surfactants and purified water as claimed in claim h wherein surface of the disc has concentric corrugations.

11. A process for purification of grey water and recovery of surfactants and purified water by the device as claimed in claim 1, the process comprising:
   a. filtering the grey water through an ultra filter;
   b. sparging air at a flow rate of 1-200 L/min into the filtered grey water to be purified contained in the airtight container;
   c. providing the foam generated a residence time of at least half a minute;
   d. channeling foam generated from the container onto rotating disc of the foam breaking device;
   e. stopping the sparging of air after a time period of at least 1 minute;
   f. recovering surfactant concentrate from the collection tray; and
   g. recovering purified water from the air tight container.

12. A process according to claim 11, wherein ratio of grey water to air in the container is in the range 1:1 to 1:100.

13. A device for purification of grey water and recovery of surfactants and purified water comprising:
   i. an air tight container for holding grey water comprising a first outlet port for discharging out foam and a discharge port for discharging out purified water;
   ii. the container comprising a means for aeration of contents of the container;
   iii. a foam conveyor connected to the first outlet port;
   iv. a foam breaking device;
   v. an ultra filter; and
   vi. a pump configured to receive the grey water from the air tight container, provide the grey water to the ultra filter, and cause filtered grey water to be provided from the ultra filter to the air tight container;
wherein the ultra filter and the pump are in fluid communication with the air tight container;
wherein the first outlet port is in fluid communication with the foam breaking device;
wherein the foam breaking device comprises:
   a. an inverted cup positioned over a collection tray wherein the cup is fixed to the collection tray and is provided with an air vent; and
   b. a disc connected to a motor to facilitate rotation of the disc and placed above the collection tray and rotatably connected to the lid of the collection tray;
   c. a second outlet port for receiving concentrated surfactants; and
   d. an air vent configured to create a positive pressure within the foam breaking device; and
wherein the foam conveyor establishes fluid communication between the first outlet port and the disc of the foam breaking device.

* * * * *